June 4, 1929. C. A. DAVIS Re. 17,313

VALVE TOOL

Original Filed March 28, 1921 2 Sheets-Sheet 1

Inventor

Claud A. Davis

By Owen & Owen

Attorneys

June 4, 1929. C. A. DAVIS Re. 17,313
VALVE TOOL
Original Filed March 28, 1921 2 Sheets-Sheet 2
Fig. 4
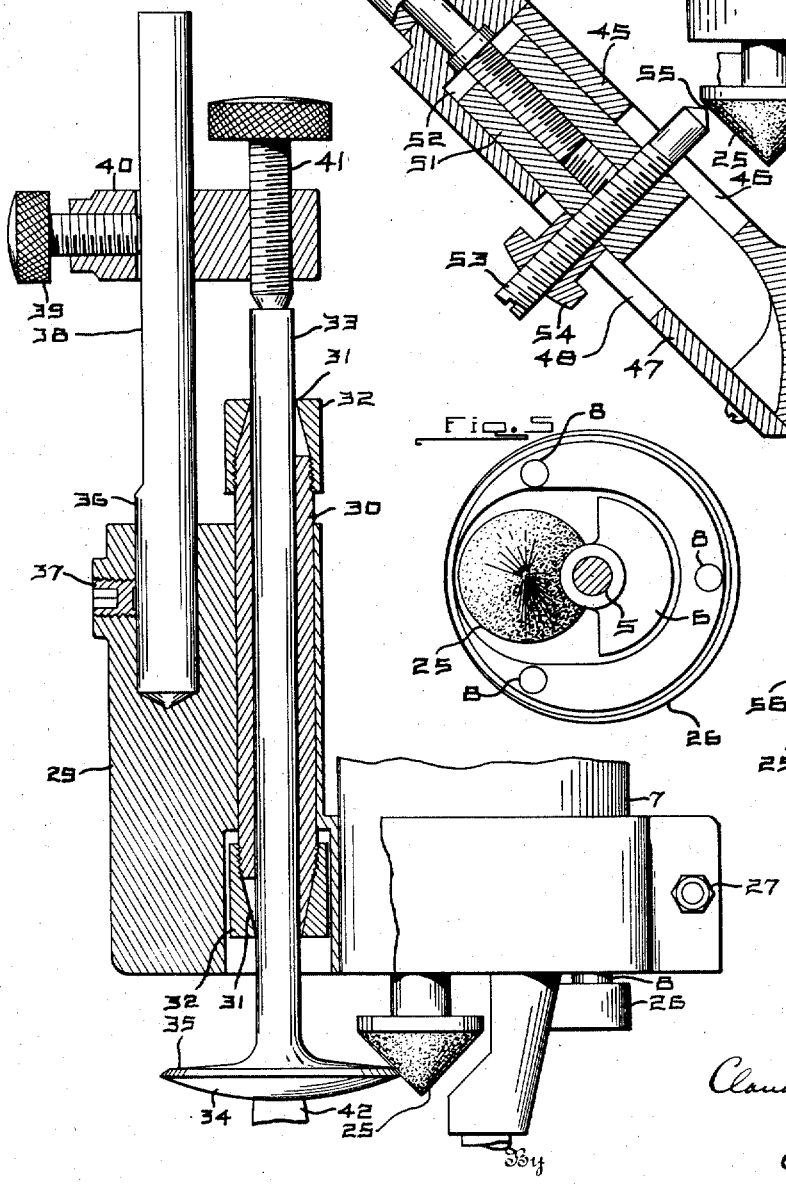
Fig. 6
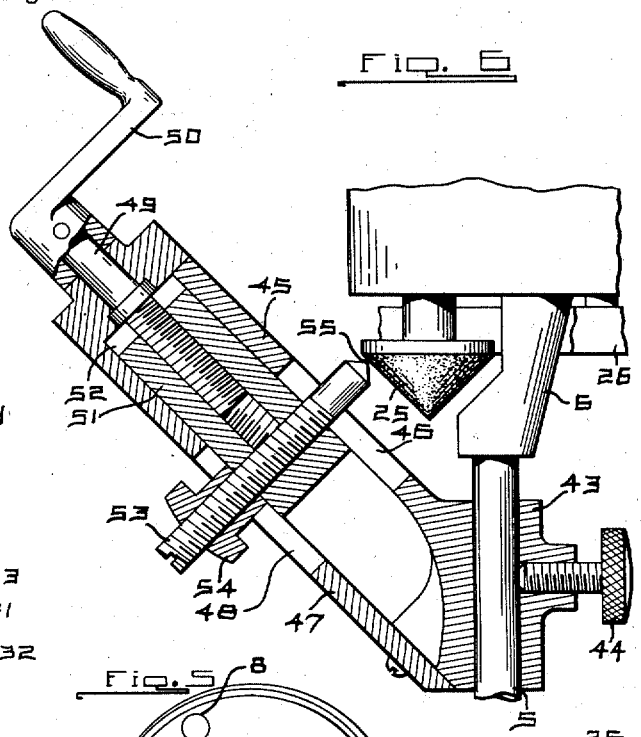
Fig. 5
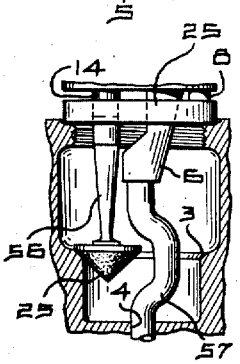
Fig. 7
Inventor
Claud A. Davis
By Owen & Owen
Attorneys Reissued June 4, 1929. Re. 17,313

UNITED STATES PATENT OFFICE.

CLAUD A. DAVIS, OF TOLEDO, OHIO, ASSIGNOR, BY MESNE ASSIGNMENTS, TO THE HALL MFG. COMPANY, OF TOLEDO, OHIO.

VALVE TOOL.

Original No. 1,591,288, dated July 6, 1926, Serial No. 456,150, filed March 28, 1921. Application for reissue filed September 6, 1927. Serial No. 217,854.

This invention relates to grinding tools but more particularly to tools for grinding valves and valve seats of internal combustion engines.

An object of the invention is to provide a simple and efficient tool for grinding valve seats which is portable and may be quickly and conveniently mounted in position for use in properly centered relation to the seat to be ground.

Another object is to provide a new and improved grinding tool which may be readily adapted for grinding valve heads by the same grinding element used for grinding the valve seat, thereby to effect an accurate fit between the head and seat.

Other objects will hereinafter appear.

An outstanding characteristic of the invention consists in the provision of a pilot mounted in the passage leading from the valve seat and in fixed relation to the seat for properly centering or positioning the mounting carrying the grinder element which may swing or revolve about the pilot and progressively grind the seat. It is apparent that the tool is accurately positioned at all times with respect to the seat and an unskilled operator may work it to advantage. The simplicity of construction required to carry out the above feature not only lends itself to commercial production but also enables the number of moving parts to be reduced to a minimum, so that the tool may be kept in operation without repair for an extended period of time.

Referring to the drawings:—

Fig. 4 is a side elevation with parts broken away of the poppet valve as mounted for grinding with this grinding device.

Fig. 5 is a bottom plan view of the grinder with the valve attachment removed.

Fig. 6 is a fragmentary view of the grinder in connection with an upkeep device for trimming the grinder wheel, and Fig. 7 is a fragmentary view of the device adapted to a countersunk valve seat.

Figure 1:
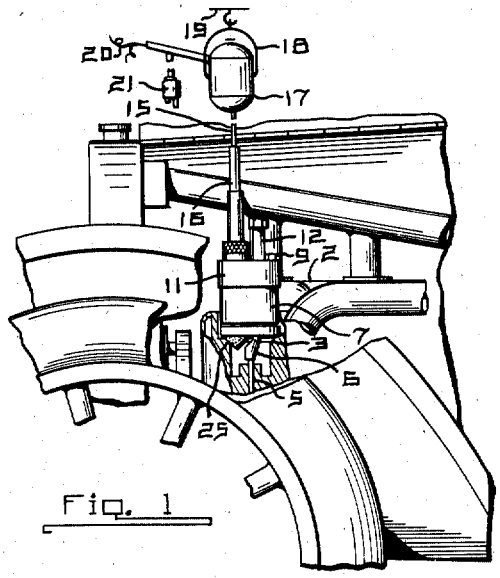
Figure 1 is a fragmentary view of a motor in position in a motor vehicle showing an embodiment of the device connected to grind a valve seat in said motor.
Figure 2:
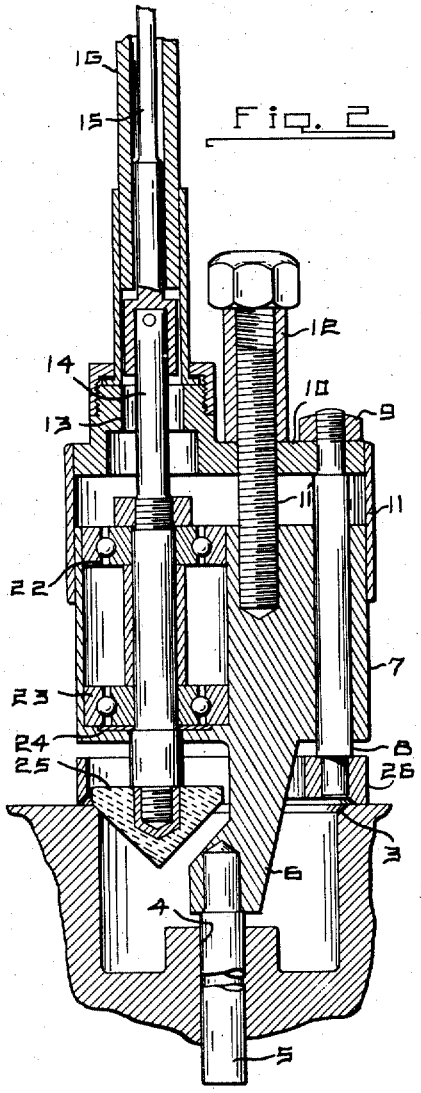
Fig. 2 is an enlarged view in central vertical section of the grinder in the operative position shown in Fig. 1.
Figure 3:
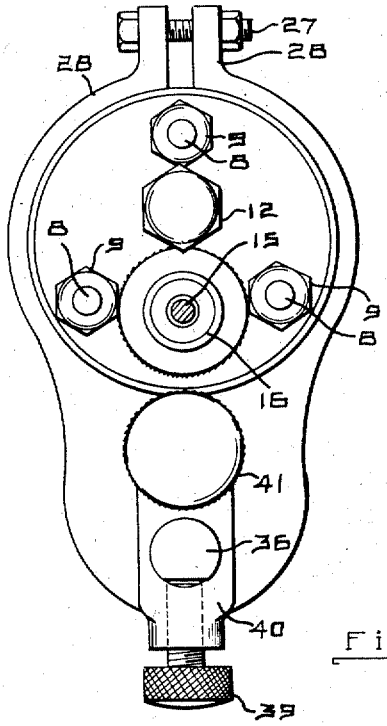
Fig. 3 is a top plan view of the grinder carrying a poppet valve to be ground.

Motor vehicle 1 is shown as provided with motor 2 having the valve seat 3 provided with concentric valve stem opening 4. The device of this disclosure embodies a stem 5 which may be inserted in this valve stem guide or seat 4. Mounted on this stem 5 is bracket portion 6 of member 7. This member 7 is slidably mounted on three studs 8 fixedly connected by nuts 9 with housing or main head 10 having fast therewith a skirt 11 extending down over the cylindrical member 7. Fixed in the member 7 is a threaded rod 11′ protruding through the housing head 10 to be engaged by sleeve nut 12. Rotation of this sleeve nut 12 accordingly serves to adjust this member 7 in or out of the housing 10, 11.. Eccentric of this housing 10, 11, is opening 13 through which extends shaft 14 pivotally connected to flexible shaft 15 in sheathing 16 extending to motor 17 which may be swingably mounted by bail 18 from a support 19. Electric power supply wires 20 may, as controlled by switch 21, control the operation of the motor 17 for rotating by means of the flexible shaft 15 the shaft 14 in the housing 10, 11. This shaft 14 extends through the member 7 and has anti-friction bearings 22, 23, for carrying this shaft 14 as to the member 7. There is also provided in the region adjacent the anti-friction bearing 23, a dust excluding fiber disk 24.

This shaft 14 terminally carries a grinder 25, which may be an abrasive element as for instance a carborundum cone, the face of which may correspond to the inclination of the valve seat 3 to be ground. The guide studs 8 for the member 7 extending therethrough connect to a positioning rim or member 26 which may abut the face of the motor 2 in the region adjacent or surrounding the seat 3 to be ground. This engaging means 26 accordingly assists in maintaining the plane of the grinding region parallel to the plane of the seat 3, while the stem 5 tends to center the grinding device as to this seat 3. The position of this grinder 25 as to the seat 3 is adjusted by the operation of the nut 12 in permitting the member 7 to move down toward the member 26, or be pulled away from member 26.

As this grinder 25 is not only held as to its axis parallel to the axis of the valve seat 3 but is centered therewith, the high speed rotation of the grinder 25 serves for effectively determining the re-facing of the seat 3, and this is effected through the angular extent of the seat 3 by the grasping of the housing 10, 11, and gradually swinging it around to move the grinder about the region of the face 3. This grinder 25 is eccentric to the seat 3 and describes its orbit, relatively thereto.

With the seat 3 in the motor 2 thus refinished or re-faced, it is desirable that there be identical angular position of the face of the valve. To this end bolt 27 may clamp arms 28 about the member 7 to carry bracket 29 having fixed therein a sleeve 30 provided with tapered kerfed ends 31 over which nuts 32 may be drawn for snugly holding and centering stem 33 of poppet or mushroom valve 34 having inclined valve seat 35 herein shown at 45° as is the inclination of the seat 3.

Also carried by this bracket 29 is a rod 36 fixed in the bracket by stud 37. This bracket stem 36 has a flat face 38 which may be engaged by set screw 39 for fixing guide block 40 carrying set screw 41 bearing against the end of the valve stem 33 thereby permitting an adjustment of this valve stem 33 through the sleeve 30 and accordingly shifting the valve as to the member 7 as well as the housing 10, 11, 26. This permits a bringing of the angular face 35 of the mushroom valve into the desired position as to the grinder 25. In this position, the grinder 25 is in a position eccentric to the seat 35 to be ground. Relative movement between this grinder 25 and the seat 35 is effected by screw driver 42 engaging the usual terminal notch in the valve 34 and rotating this valve 34 having its stem 33 centered and aligned in the sleeve 30.

Inasmuch as the grinding of valves may involve finishing many of the same diameter of seats 3 and of the same diameter of seats 35, as well as the same inclination for these seats 3 and 35, there may be grooves worn in the grinders 25. As this device is designed particularly for garage use wherein the upkeep of the tool itself is a matter of importance, the refinishing of this grinder 25 by trimming such grinder is readily and conveniently effected by mounting on the stem 5 a bracket 43, fixing such bracket by set screw 44. This bracket 43 is shown as having integral therewith arm 45 with slot 46 and attached thereto arm 47 with slot 48. This arm 48 carries stem 49 for crank 50. This stem 49 has engagement with nut 51 to reciprocate this nut in guideway 52 between the arms 45, 47. This nut 51 has transversely thereof stem 53 which is longitudinally adjustable through the nut 51, and locked by nut 54.

This stem 53 terminally carries a trimming point as a diamond 55 for engaging the face of the grinder 25 to trim such grinder 25 as rotated from the motor 17. The progress of this diamond 55 across the face of this grinder 25 is effected by rotating the handle 50.

There is accordingly provided in this simple device of the disclosure a tool which in a very brief interval of time may accurately grind a valve truly centered and as accurately grind the seat for such valve also truly centered, each of which grindings occur in planes positively determined as perpendicular with the axis line of the valve. Furthermore, the grinder of this tool or device is one, the upkeep of which may be accurately handled by trimming the face, in mounting this trimmer with the device, and running the device as the device would be run in normal grinding operations. The inclination of the way 52 in the trimming bracket attachment is parallel to the face of the grinder 25, and this inclination of course corresponds with the inclination to be given the seats to be ground, whether such be 30°, 45°, or such inclination as may be met with or found acceptable in practice.

In instances where it is desired to face or grind a valve seat which is countersunk, the device of this disclosure may be readily adapted thereto by providing extension 56 (Fig. 7) from the shaft 14 to carry the grinder 25 eccentrically in the position of the valve seat 3. In the instances where the diameter of the grinder 25 is such that it extends over into the axial line of the centering stem 5, there may be substituted for this stem 5 crank stem 57 held in its mounting in the bracket portion 6 against rotation relatively thereto. The device is thus complete for surface facing or grinding the seat 3 by rotating the grinder 25 and shifting the housing for the eccentric travel of this grinder 25 about the surface 3.

While the form of mechanism here shown and described is admirably adapted to fulfill the objects primarily stated, it is to be understood that it is not intended to confine the invention to the one form of embodiment herein described, for it is susceptible of embodiment in various forms all coming within the scope of the claims which follow.

What is claimed and it is desired to secure by United States Letters Patent is:—

1. A tool for grinding a valve seat having a concentric valve stem guide, said tool comprising a mounting, a pilot projecting from the mounting for engaging a valve stem guide, and a rotary grinder tapered at a desired angle for a valve seat and carried by the mounting in eccentric relation to said pilot for contacting with an associated valve seat at a side of the pilot and capable of being revolved around the pilot as an axis.

2. A tool for grinding a valve seat having a concentric valve stem guide, said tool comprising a mounting, a pilot projecting from the mounting for engagement with a valve stem guide, a rotary grinder tapered at a desired angle for a valve seat and carried by said mounting in eccentric but parallel axial relation to the guide-engaging portion of said pilot, and means for adjusting the position of the grinder axially of the seat.

3. A tool for grinding a valve seat having a concentric valve stem guide, said tool comprising a mounting, a pilot projecting from the mounting for engagement with a valve stem guide, a rotary grinder tapering at a desired angle for a valve seat and carried by said mounting in eccentric relation to said pilot and spaced longitudinally from the outer end portion of the pilot, and manually operated means for adjusting the position of the said grinder for varying the depth of cut in the valve seat.

4. A tool for grinding a valve seat having a concentric valve stem guide, said tool comprising a mounting having a part coacting with a valve stem guide, and a rotary grinder tapering at a desired angle for a valve seat and in eccentric but parallel axial relation to said part and in inwardly spaced relation from the outer end portion of said part and adapted to be moved with the mounting progressively around the surface of a seat.

5. A tool for grinding a valve seat having a concentric valve stem guide, said tool comprising an angularly shiftable mounting, a pilot for the mounting engageable with a valve stem guide, a rotary grinder carried by said mounting and having its axis of rotation spaced laterally from the pilot axis and being movable in an orbit about said pilot, and mechanically operated means for adjusting the position of the said grinder for varying the depth of cut in the valve seat.

In testimony whereof I have hereunto signed my name to this specification.

CLAUD A. DAVIS.